Oct. 6, 1964 W. STELZER 3,151,914
TRACTOR-TRAILER BRAKE SYSTEM
Filed Jan. 10, 1962 3 Sheets-Sheet 3
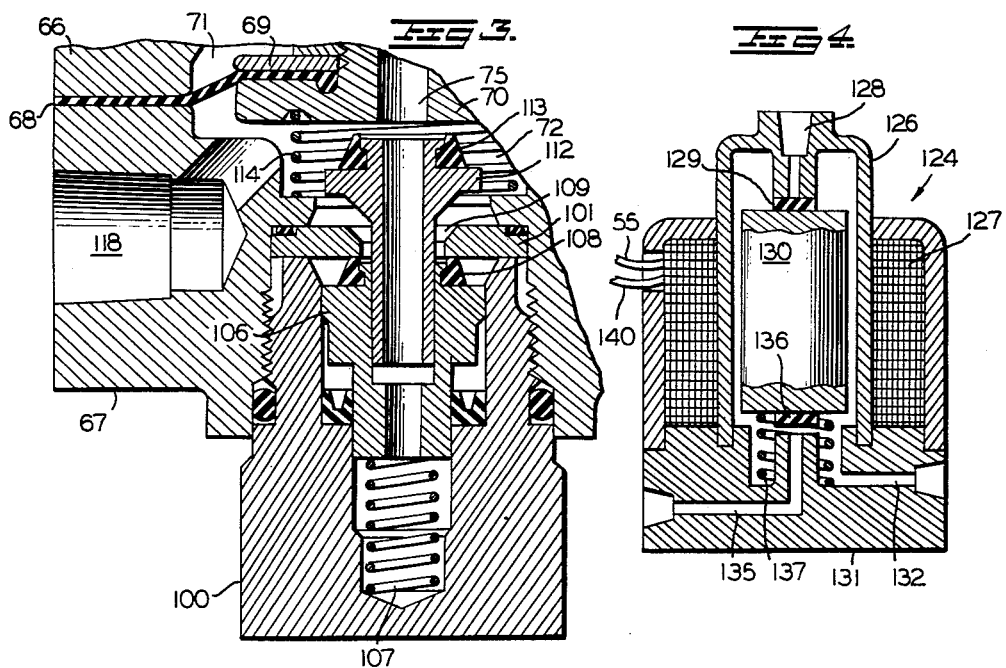
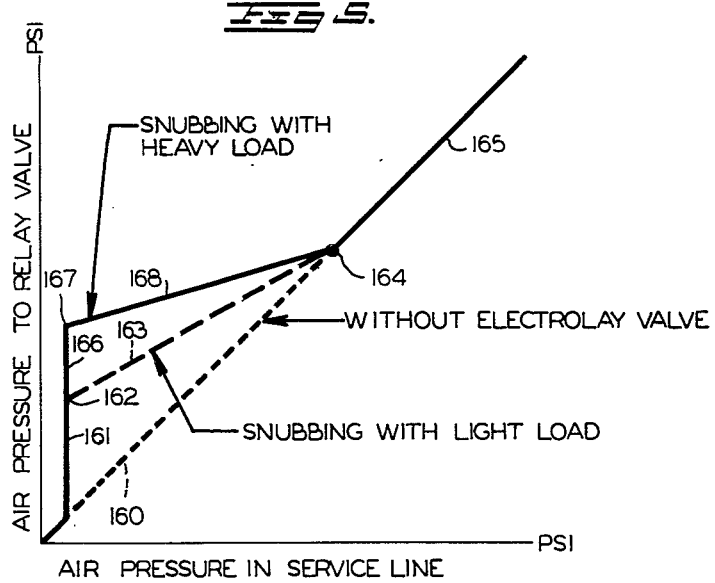
INVENTOR
WILLIAM STELZER
BY John F. Phillips
ATTORNEY

# United States Patent Office 3,151,914
Patented Oct. 6, 1964

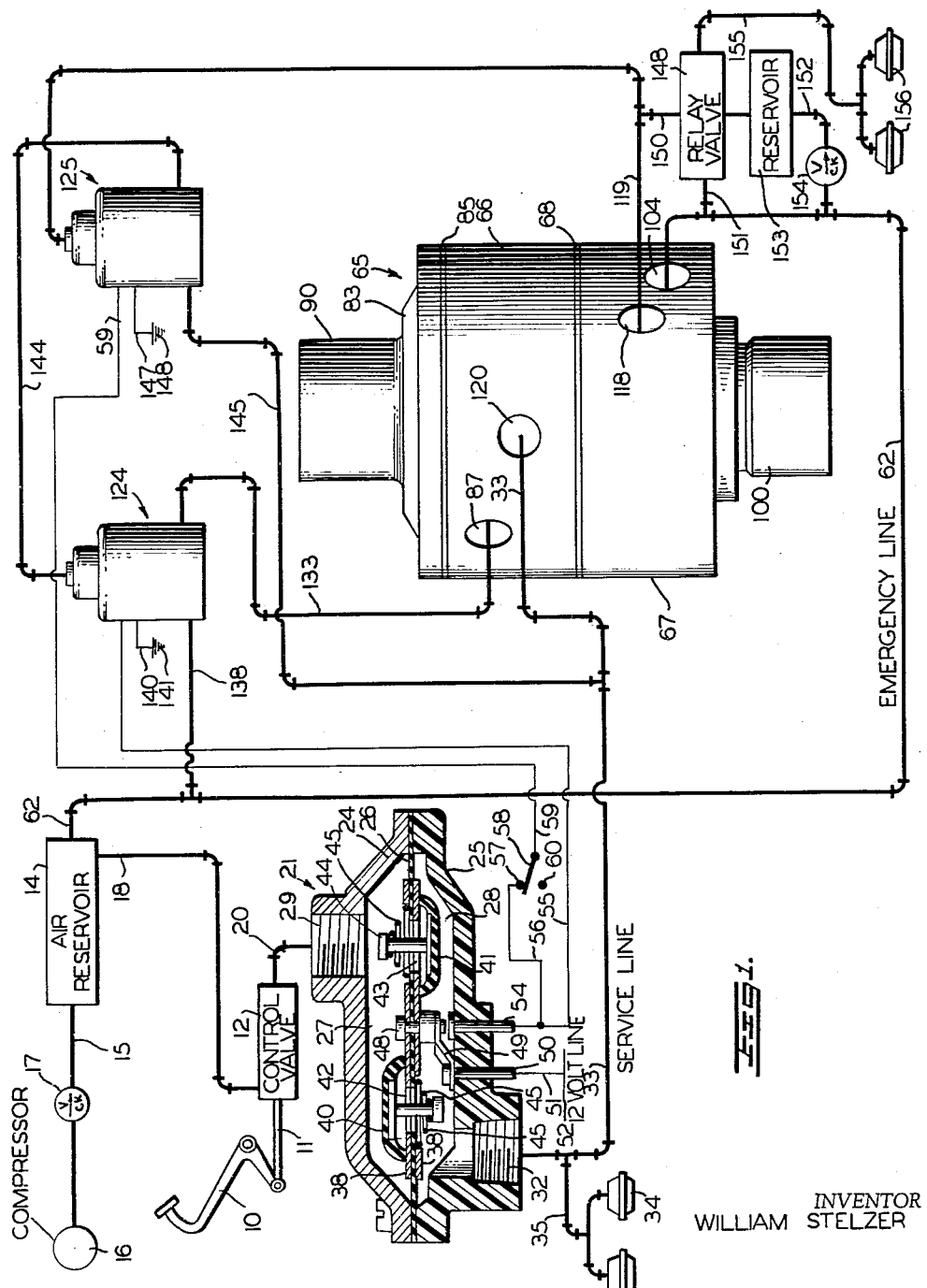

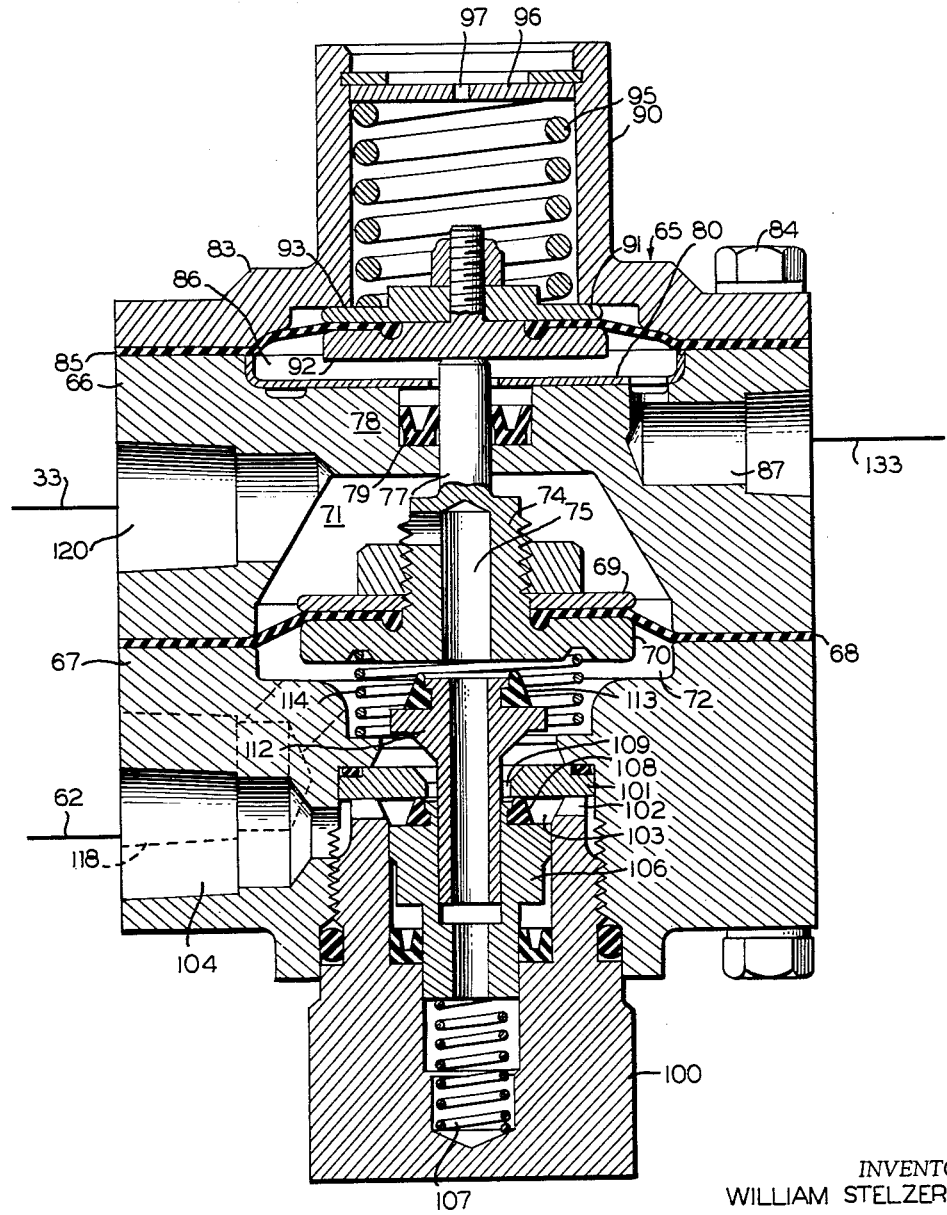

3,151,914
TRACTOR-TRAILER BRAKE SYSTEM
William Stelzer, Bloomfield Hills, Mich., assignor to Kelsey-Hayes Company, Romulus, Mich., a corporation of Delaware
Filed Jan. 10, 1962, Ser. No. 165,418
12 Claims. (Cl. 303—15)

This invention relates to a tractor-trailer brake system and is an improvement over the structure shown in my co-pending application, Serial No. 130,360, filed August 9, 1961.

My co-pending application referred to above discloses a highly efficient tractor-trailer brake system which overcomes the time lag occurring between operation of the tractor brake pedal and the application of the trailer brakes, which sequence of operation, as is well known, frequently causes jack-knifing of the tractor-trailer combination. My co-pending application shows a novel control valve mechanism having electric valve control means therein which function, upon initial operation of the brake pedal, to operate the emergency relay valve to energize the tractor brakes, the valve mechanism being so modulated that when the signal transmitted by the service line to the trailer picks up in intensity to correspond to pressure supplied to the tractor brakes, the service line pressure takes over the controlling of the emergency relay valve. The system is particularly effective not only for providing a substantially immediate application of the trailer brakes without their lagging relative to the tractor brakes, but also provides novel means whereby initial operation of the brake pedal may be employed for snubbing of the trailer brakes without applying the tractor brakes.

In the co-pending application referred to the valves of the automatic valve mechanism are accurately controlled by pressures acting on diaphragms and by special solenoids. The present invention has for an important object a highly improved construction which employs in a novel manner solenoid valves which merely act as pilot valves, not called upon to perform substantial work, thus permitting the use of small conventional solenoid valves.

A further object is to provide such a construction wherein all of the novel functional characteristics of my co-pending application are performed as referred to above with a minimum number of parts of simple construction.

A further object is to provide such a mechanism wherein application of the trailer brakes at least as early as application of the tractor brakes is provided for, together with the feature of snubbing the trailer brakes without applying the tractor brakes, and wherein the initial application of the trailer brakes may be varied according to the loading of the trailer, all with the use of a simplified construction employing small conventional solenoid valves.

A further object is to provide an automatic valve mechanism in a system of this character in combination with conventional solenoid valves wherein pressures within the valve mechanism, acting on pressure responsive elements such as diaphragms, provide for an accurate modulating action for operating the emergency relay valve of the trailer for controlling the trailer brakes.

Other objects and advantages of the invention will become apparent during the course of the following description.

In the drawings I have shown one embodiment of the invention. In this showing

FIGURE 1 is a diagrammatic view of the system, the automatic valve mechanism and the solenoid valves being shown in elevation and the pedal operated pressure control switch being shown in section;

FIGURE 2 is an enlarged axial sectional view of the control valve mechanism;

FIGURE 3 is a fragmentary axial sectional view of a portion of the automatic valve mechanism taken in a different plane to show one of the pressure connections;

FIGURE 4 is an axial sectional view through one of the solenoid valves, and

FIGURE 5 is a graph illustrating relative braking pressures under different conditions.

Referring to FIGURE 1, the numeral 10 designates the brake pedal of the tractor connected by a rod 11 to a control valve mechanism 12, the operation of which controls the application of the tractor and trailer brakes as described below.

The present mechanism is shown as a superatmospheric pressure-operated system, and accordingly the tractor is provided with an air reservoir 14 in which pressure is maintained through a pipe 15 leading to a compressor 16, the pipe 15 having a check valve 17 therein. A pressure line 18 leads from the reservoir 14 to the control valve 12, and operation of this valve supplies pressure fluid through a line 20 to a pressure operated switch mechanism indicated as a whole by the numeral 21, which mechanism forms per se no part of the present invention, and is disclosed and claimed in my co-pending application referred to.

The switch mechanism 21 comprises upper and lower casing sections 24 and 25, the latter of which is preferably formed of insulating material, and a diaphragm 26 is clamped between these casing sections to define therewith upper and lower chambers 27 and 28. The chamber 27 communicates through a port 29 with the fluid line 20. The chamber 28 communicates through a port 32 with the forward end of a service line 33 extending rearwardly to the trailer for a purpose to be described. The tractor is provided with the usual brake actuators 34 connected by a line 35 to the service line 33.

The diaphragm 26 is clamped between plates 38 to provide for the stiffening of the diaphragm and to provide seats for upper and lower oppositely opening check valves 40 and 41. These valves control the flow of fluid between the chambers 27 and 28 through ports 42 and 43 respectively. Each check valve is provided with a stem 44 and is biased to closed position by a spring 45. It will be apparent that when pressure in the chamber 27 is higher to a predetermined extent than pressure in the chamber 28, the valve 41 will open to supply pressure to the service line 33 and to operate the brake actuators 34. When the brakes are released, as described below, pressure in the chamber 28 will be higher than pressure in the chamber 27. Thus service line pressure will be relieved into the chamber 27 and will be vented to the atmosphere through the line 20 and valve mechanism 12, which normally connects the line 20 to the atmosphere.

Centrally thereof, the diaphragm 26 is provided with a post 48 connected to one end of a resilient electrical switch 49, the other end of this switch being connected to a binding post 50, electrically connected as at 51 to the 12-volt line of the vehicle, indicated with the numeral 52. The post 48 is movable downwardly immediately upon the building up of pressure in the chamber 27, upon operation of the valve mechanism 12, and before sufficient pressure is built up in the chamber 27 to open the valve 41. Downward movement of the post 48 engages it with a contact at the upper end of a binding post 54, connected to two wires 55 and 56 to be referred to in detail below. The wire 56 is provided with a contact 57 engageable by a switch 58 connected to one end of a wire 59, both of the wires 55 and 59 leading rearwardly to the trailer. Under conditions to be described, the switch 58 is manually moved into engagement with a dead contact 60, thus breaking the circuit between the wires 56 and 59.

As previously stated the service line 33 and wires 55 and 59 extend rearwardly to the trailer to a control mechanism to be described. Similarly an emergency line 62 extends rearwardly to the trailer and has its forward end tapped into the reservoir 14. Accordingly unless a rupture occurs therein, the emergency line 62 is always subject to air reservoir pressure.

Referring to FIGURE 2 the numeral 65 designates the automatic valve mechanism of the present invention as a whole. This mechanism compises upper and lower body sections 66 and 67 between which is clamped the periphery of a diaphragm 68, clamped between plate portions 69 and 70. The diaphragm assembly forms with the body section 66 a chamber 71, and similarly forms with the body section 67 a chamber 72. The plate 70 is provided with a stud portion 74 having a passage 75 therethrough normally connecting the chambers 71 and 72. The bottom of the plate 70 serves as a seat for a valve to be described, to thus control communication between the chambers 71 and 72.

The stud 74 has an upstanding stem 77 extending through the top wall 78 of the body section 66, and leakage around the stem 77 is prevented by a seal 79 maintained in position by a retaining plate 80.

A cap member 83 is affixed by bolts or screws 84 to the body section 66 and clamps in position thereon a diaphragm 85. This diaphragm forms with a depression in the top of the body section 66 a pressure chamber 86 communicating radially through the body section 66 through a port 87.

The cap 83 is provided with a vertically extending cylindrical portion 90. The center of the diaphragm 85 is clamped between upper and lower plates 91 and 92, and upward movement of the diaphragm structure is limited by engagement of the plate 91 with a shoulder 93 formed in the cap 83. A spring 95 engages at its lower end with the plate 91 and at its upper end with a spring seat formed as a disk 96 vented to the atmosphere, 97, so that the space above the diaphragm 85 is always at atmospheric pressure.

A plug 100 is threaded into the bottom of the body section 67 and maintains in position therein a valve seat 101, the upper end of the plug 100 being notched as at 102 to afford communication between a chamber 103, within the upper end of the plug, and a port 104 connected to the rear end of the emergency line 62 (FIGURE 1). A valve body 106 is slidable in the plug 100 and is biased upwardly by a spring 107. The valve body at the top thereof carries a resilient valve 108 normally engaged against the bottom of the seat 101 to close communication between the chambers 72 and 103, the seat 101 having a passage 109 therethrough to connect these chambers when the valve 108 is open. A second valve body 112 has a pressed fit with the valve body 106 and is provided at its upper end with a normally open valve 113 engageable with the bottom of the plate 70 when the latter moves downwardly as described below. A spring 114 biases the plate 70 upwardly together with the elements connected thereto to tend to hold the upper end of the stem 77 in engagement with the plate 92.

The chamber 72 communicates through a port 118 (FIGURE 3) with a pipe 119 further described below. The chamber 71 (FIGURE 2) communicates through a port 120 with the rear end of the service line 33.

Shown separately from but capable of being embodied as a part of the valve mechanism 65 is a pair of pilot solenoid valve devices respectively indicated as a whole by the numerals 124 and 125. One of the solenoid valve devices, for example the device 124, is shown in FIGURE 4. Such device comprises a tubular core 126 surrounded by a coil 127, and the top of the core is shown as having a passage 128 therethrough normally engaged by a resilient valve 129 carried by the top of the solenoid armature 130. The bottom of the valve device is formed as a body 131 having a passage 132 connected to one end of a fluid line 133 (FIGURE 1), and the other end of this fluid line communicates with the port 87 (FIGURE 2) to determine the pressure in the chamber 86. The passage 132 is always in communication with the space within the core 126. The body 131 is also provided with a passage 135 the inner end of which terminates axially of and below the armature 130 and is adapted to be closed by a normally open resilient valve 136 carried by the armature 130. A spring 137 biases the armature 130 upwardly to the normal position shown in FIGURE 4. The radially outer end of the passage 135 is connected by a line 138 (FIGURE 1) with the emergency line 62. The wire 55 (FIGURE 1) is connected to one terminal wire of the coil 127. The other terminal wire 140 is grounded as at 141 (FIGURE 1).

The passage 128 of the solenoid device 124 is connected by a fluid line 144 to the passage 132 of the solenoid device 125. The passage 135 of the device 125 is connected by a fluid line 145 to the service line 33 (FIGURE 1). One terminal wire of the device 125 is connected to the other end of the wire 59, while the second terminal wire 147 is grounded as at 148.

The passage 128 of the device 125 is connected to the other end of the fluid line 119. A conventional relay valve 148 is connected in the line 119 as at 150. The relay valve is also connected by a line 151 to the emergency line 62 so that the relay valve functions in the conventional manner to be operative by pressure in the line 150 provided pressure is maintained in the emergency line 62, as will be understood.

The emergency line 62 also functions to maintain through a line 152 trailer brake operating pressures in a reservoir 153, the line 152 having the usual check valve therein. The relay valve 148 is connected as at 155 to trailer brake actuators indicated at 156.

In FIGURE 5 there is illustrated a graph showing relative initial and later pressures supplied to the trailer brake motors 156 upon operation of the brake pedal 10 and the parts controlled thereby, including the valve mechanism 65. The line 160 indicates progressively increasing pressures in the service line 33. The operation of the present mechanism is such that upon the closing of the switch 49, pressure supplied to the relay valve 148 through lines 119 and 150 increases abruptly as indicated by the line 161, thus operating the relay valve 148 to supply substantial pressure to the trailer brake actuators 156 before the tractor brake actuators 34 are energized, or energized to an appreciable extent. Assuming that the switch 58 (FIGURE 1) is set for a light load, pressure indicated by the line 160 stops its abrupt rise at the point 162 and then progressively increases as indicated by the line 163, the pressure increasing but at a rate lower than the rate of increase in service line pressure indicated by the line 160. Pressure indicated by the line 163 becomes equal to service line pressure at the point 164, at which point service line pressure takes over the controlling of the relay valve 153. From this point on pressure supplied to the relay valve 148 will coincide with pressures supplied to the tractor brake actuators 34, as indicated by the line 165 in FIGURE 5. When the switch 58 (FIGURE 1) is set for a heavier load, the abrupt rise in pressure supplied to the relay valve 148 through lines 119 and 150 will not stop at the point 162 (FIGURE 5) but will continue to rise as indicated by the line 166 until the point 167 is reached. Thereafter, due to the action of the present system, pressures supplied to the trailer brake actuators 156 will continue to rise as indicated by the line 168, the rate of increase being lower than the rate of increase indicated by the line 163 until the point 164 is reached, coinciding with service line pressures. Thereafter, the controlling of the relay valve 148 will be taken over by the service line as indicated by the line 165.

*Operation*

The parts are shown in the drawings in their normal positions. The chamber 86 (FIGURE 2), under such conditions, communicates through port 87, line 133, passage 132 (FIGURE 4) of the solenoid device 124, thence through passage 135 and line 138, with the emergency line 62. Accordingly source pressure will be present in the chamber 86 to maintain the plate 91 in engagement with the shoulder 93 with the spring 95 compressed. The spring chamber of course is open to the atmosphere through port 97 (FIGURE 2). Since the brake pedal 10 is released, atmospheric pressure will be present in the service line 33 and also in the chamber 71 (FIGURE 2) to which it is connected. The chamber 103 is always in communication with the source of pressure through the port 104 and emergency line 62. The operation of the device for a heavy load will now be described, and it will be assumed that the switch 58 is in engagement with the dead contact 60.

If the pedal 10 is now depressed, the control valve 12 will operate conventionally to disconnect the line 20 from the atmosphere and connect it to the pressure line 18. There will be an immediate rise in pressure in the chamber 27, and the switch 49 will be promptly closed prior to the opening of the valve 41. Under such conditions, current will flow from the 12-volt line 52 through the switch 49 and line 55 to the coil of the solenoid device 124, and thence to ground 141. The armature 130 of the solenoid device 124 will move downwardly to close the passage 135 and open the port 128. Pressure fluid in the chamber 86 (FIGURE 2) will now flow through the line 133, through passage 132, which will now be cut off from the pressure line 138. The fluid will flow through port 128, line 144, through passage 132 of the solenoid device 125, which is not energized. From the passage 132 of the solenoid device 125, fluid flows through line 145 into the service line, which at this time is still at atmospheric pressure.

The reduction of pressure in the chamber 86 releases the spring 95 to move the stem 77 downwardly together with the elements connected thereto including the center of the diaphragm 68. Thus the bottom of the passage 75 (FIGURE 2) will be closed by the valve 113 and communication between the chambers 71 and 72 through the passage 75 will be cut off. Slight additional downward movement of the plate 70 will move the valve body 106 downwardly to open the valve 108 and thus admit pressure from the chamber 103 to the chamber 72. This pressure flows through port 118 through line 119 to the relay valve to operate such valve to supply pressure fluid from line 151 through the line 155 to the trailer brake actuators 156.

The foregoing operation takes place substantially instantaneously upon initial movement of the brake pedal. If it is desired to merely snub the trailer brakes without applying the tractor brakes, a very slight movement of the pedal 10 will establish in the chamber 27 the pressure necessary to close the switch 49 without opening the valve 41. Under such conditions the foregoing operation will take place and the trailer brakes will be snubbed. If tractor brake application is also desired, the brake pedal 10 will be further moved to supply greater pressure to the chamber 27, and the valve 41 will open to admit pressure to the chamber 28 and thus to the service line and to the tractor brake actuators 34.

Pressure admitted to the chamber 72 acts upwardly against the diaphragm 68 and when this pressure reaches a predetermined point, it will act through the stem 77 to counteract the spring 95, and slight upward movement of the diaphragm 68 and associated elements will allow the spring 107 to move the valve body 106 upwardly and thus seat the valve 108 and cut off pressure to the chamber 72. It is this modulated pressure in the chamber 72 which is supplied to the relay valve 148 to apply the trailer brakes through their actuators 156. This admission of pressure to the chamber 72 causes an abrupt increase in pressure in the line 150 (FIGURE 1) causing the relay valve to effect an abrupt rise in pressure in the trailer brake actuators 156, and this increase in air pressure to the relay valve is indicated in FIGURE 5 by the lines 161 and 166 up to the point 167, which will be the point at which the pressure valve 108 (FIGURE 2) seats.

Assuming that the pedal has been operated to apply the tractor brakes, service line pressure will be built up after an interval of time in the chamber 71, this chamber being connected to the service line 33. This pressure in the chamber 71 acts on the diaphragm 68 to crack the valve 108 and admit higher pressure to the relay valve 148 for an increased application of the trailer brakes. Service line pressure, flowing through line 145, solenoid device 125, line 144, solenoid device 124 and line 133 will be communicated to the chamber 86 (FIGURE 2) and pressure in such chamber acts through the diaphragm 85 to oppose the spring 95. The effective area of the diaphragm 85 being less than the effective area of the diaphragm 68, the net result is a force acting downwardly on the diaphragm 68 to assist the spring 95. During this period, pressure supplied to the relay valve 148 will increase as indicated by the line 168 (FIGURE 5) until the point 164 is reached. When the pressure in the service line 33 and chamber 86 has increased sufficiently to overcome the spring 95, pressures in the chambers 71 and 72 will be equal. Beyond the point 164 in FIGURE 5, if operation of the brake pedal is continued, the net pressure acting downwardly on the diaphragm 68 will continue to supply pressure from the chamber 103 to the chamber 72 for the increased application of the trailer brakes through operation of the relay valve 148. Thus, once pressure has been built up in the rear end of the service line leading to the chamber 71 (FIGURE 2) that is, beyond the point 164 in FIGURE 5, trailer brake operation will take place proportionate to service line pressures and thus proportional to the application of the tractor brakes 34, as indicated by the line 165 in FIGURE 5.

If the trailer is empty or lightly loaded, it is desired that the snubbing action of the trailer brakes be reduced. Under such conditions the operator will move the switch 58 (FIGURE 1) into engagement with the contact 57. Thus when the brake treadle is depressed lightly to close the switch 49, both of the solenoid devices 124 and 125 will be energized. The armatures of the two solenoids will move downwardly, opening the ports 128 of both solenoids and closing the passages 135. Under such conditions the chambers 72 and 86 will be in communication with each other through line 119 (FIGURE 1), port 128, and passage 132 of the solenoid device 125, line 144, port 128 and passage 132 of the solenoid device 124, and line 133. Whereas the initial operation when the trailer is heavily loaded opens the chamber 86 to the atmosphere, it is now opened to the chamber 72. Therefore, pressure admitted to the chamber 72 will be present also in the chamber 86.

At the time of initial connection of the chambers 72 and 86 to each other, service line pressure (and pressure in the chamber 72 through passage 75) will be approximately that of the atmosphere, and accordingly the disconnection of the chamber 86 from the emergency line and the connection of such chamber to the chamber 72 releases the spring 95 to effect downward movement of the stem 77 and the parts connected thereto to close the valve 113 and crack the valve 108. This operation admits pressure to the chamber 72 and also to the chamber 86. Thus there will be upward pressures acting on both diaphragms 68 and 85 in opposition to the spring 95, whereas for a heavier load, only the pressure in the chamber 72 acts upwardly against the spring 95. The action thus modulated by a different total pressure acting upwardly against the spring 95 and accordingly the snubbing action, indicated by the line 161 in FIGURE 5, will be arrested in its abrupt increase at the point 162. In other words, due to the pressures acting upwardly on both diaphragms 68 and 85, the valve 108 will close at a lower pressure in the chamber 72 than will occur when the vehicle is heavily loaded. As service line pressure increases in the chamber 71, the valve 108 will be cracked to admit progressively increasing pressures in the chamber 72, and the trailer brake snubbing action will increase as indicated by the line 163 (FIGURE 5) until the point 164 is reached. Beyond this point upon continued operation of the tractor brake pedal, trailer brake actuation will increase under the control of service line pressures, as described above, as indicated by the line 165 in FIGURE 5. In other words under both conditions, namely when snubbing either heavy or light loads, service line pressures take over the control of the trailer brakes beyond the point 164 in FIGURE 5.

In the case of a fast brake application, as in a panic stop, it is important that the trailer brakes be applied not later than the tractor brakes, otherwise jackknifing could result. With the present system, the first increment of travel of the brake treadle causes instantaneous electric energization of the solenoid devices to cause actuation of the automatic valve mechanism 65 to transmit pressure to the relay valve which in turn energizes the trailer brake actuators. The snubbing action indicated by the lines 161 and 166 in FIGURE 5 occurs prior to tractor brake operation since even in a panic brake application, the switch 49 will be closed before the valve 41 opens to supply pressure to the service line and to the tractor brake actuators 34. To obtain the most efficient results, the automatic valve mechanism 65 should be installed as close as possible to the relay valve 148 and near the trailer brake axle where the actuators 156 are located.

The entire system is released and restored to normal condition by releasing the brake treadle or pedal 10. Under such conditions the switch 49 opens, thus de-energizing one or both of the solenoid devices 124 and 125, depending upon whether the previous operation has taken place with a lightly or heavily loaded trailer. The restoration of the control valve 12 to normal condition cuts off communication between the pressure line 18 and the pressure switch device 21 and opens the line 20 to the atmosphere. Pressure beneath the diaphragm 26 is then relieved through the valve 40. Thus pressure also will be relieved from the chamber 71, the service line 33 being returned to its normal atmospheric condition. Both solenoid devices will be restored to normal condition as illustrated in FIGURE 4. The chamber 86 will again be connected to the emergency line 62 through line 133, the solenoid device 124 as described above, and line 138. The spring 95 accordingly will be fully compressed by pressure in the chamber 86 acting on the diaphragm 85. Atmospheric pressure in the chamber 71 permits the spring 114 to lift the center of the diaphragm 68 and open the valve 113, and the pressure valve 108 will be held seated by the spring 107.

It will be apparent that the relieving of the pressure from the service line 33 past the valve 40 releases the tractor brake actuators 34. It will also be apparent that when the parts of the valve of the mechanism in FIGURE 2 are restored to normal conditions, the chamber 72 will be at atmospheric pressure since it communicates with the chamber 71. Thus pressure in the lines 119 and 150 will drop to atmospheric pressure and the relay valve 148 will be restored to normal condition to open the line 155 to the atmosphere and close it to the reservoir 153. Accordingly the trailer brakes also will be released.

In my copending application, Serial No. 130,360, referred to above, the automatic valve device, corresponding in function to the valve device 65 of the present invention, provides opposed forces for effecting valve modulation by employing special solenoids as the sources of forces acting in one direction against diaphragm pressures acting in the other direction. The present system is an improvement over the system shown in my co-pending application in that it eliminates solenoids from the valve device 65 and employs conventional inexpensive solenoid valves for controlling pressures in pressure chambers. The present system therefore is highly efficient in operation and posses all of the advantages of the prior construction but is economically advantageous thereover since the system can be manufactured at a lower cost and can be more easily serviced. Moreover, a more efficient and accurate modulating action is provided in the automatic valve mechanism.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a tractor trailer brake system, manually operable control valve means for supplying fluid pressure to actuators for the tractor brakes, a service line having a forward end connected to said control valve means to be supplied with pressure upon operation thereof, said service line having a rear end on the trailer, means including a controlled pressure line to operate trailer brake actuators, and an automatic valve mechanism having a first chamber connected to the rear end of said service line, and having a second chamber communicating with said controlled pressure line and normally communicating with said first chamber, a first pressure responsive device between said chambers, a pressure chamber connected to a source of pressure and adapted for connection with said second chamber, pressure controlling means operable by said first pressure responsive device and having a normal position connecting said first chamber to said second chamber from which it is movable to disconnect said second chamber from said first chamber and connect it to said pressure chamber, a second pressure responsive device separate from said first pressure responsive device and having a control chamber at one side normally connected to said source of pressure to maintain said pressure controlling means inoperative, and electromagnetic valve means operable upon initial operation of said control valve means for releasing pressure from said control chamber to render said pressure controlling means operative for connecting said pressure chamber to said second chamber to supply pressure thereto and thus to said controlled pressure line.

2. A system according to claim 1 wherein said electromagnetic valve means comprises a pair of three-way solenoid valves, and means for selectively operating said solenoid valves to connect said control chamber to the rear end of said service line or to said second chamber to vary the effectiveness of said pressure controlling means for admitting pressure to said second chamber.

3. In a tractor trailer brake system, manually operable control valve means for supplying fluid pressure to actuators for the tractor brakes, a service line having a forward end connected to said control valve means to be supplied with pressure upon operation thereof, said service line having a rear end on the trailer, means including a controlled pressure line to operate trailer brake actuators, and an automatic valve mechanism having a plurality of chambers one of which is connected to the rear end of said service line and a second of which is connected to said controlled pressure line, a first pressure responsive device dividing said chambers and having a passage normally connecting said named chambers, a normally open valve in said other chamber adapted to close said passage, a pressure chamber connected to a source of pressure, a normally closed pressure valve controlling communication between said pressure chamber and said other chamber and connected to said normally open valve, means exerting a constant force tending to move said first pressure responsive device to tend to close said normally open valve and open said pressure valve, a second pressure responsive device having a control chamber at one side thereof normally connected to said source of pressure to normally render said last named means inoperative for moving said first pressure responsive device, and an electromagnetic valve device operable upon initial operation of said control valve means for venting said control chamber to render said last named means operative for moving said valves to disconnect said second chamber from said first chamber and to connect said pressure chamber to said second chamber to supply operating pressure therefrom to said controlled pressure line.

4. A system according to claim 3 wherein said electromagnetic valve device comprises a three-way solenoid valve having a normally closed port communicating with the rear end of said service line, a constantly open port connected to said control chamber and a third port adapted to be closed upon energization of said solenoid valve, said third port being connected to said pressure source whereby, upon operation of said solenoid valve, said third port will be closed and said normally closed port will be opened to thereby connect said control chamber to the rear end of said service line.

5. In a tractor trailer brake system, manually operable control valve means for supplying fluid pressure to actuators for the tractor brakes, a service line having a forward end connected to said control valve means to be supplied with pressure upon operation thereof, said service line having a rear end on the trailer, means including a controlled pressure line to operate trailer brake actuators, and an automatic valve mechanism having a plurality of chambers one of which is connected to the rear end of said service line and a second of which communicates with said controlled pressure line, a pressure responsive device dividing said chambers, and provided with a passage normally connecting said chambers, a normally open valve adapted to close said passage, a pressure chamber axially aligned with said one chamber and said other chamber and at the side of said other chamber opposite said one chamber, said pressure chamber being connected to said source, a normally closed valve connected to said normally open valve and controlling communication between said pressure chamber and said other chamber, means coaxial with said chambers and arranged at the side of said one chamber opposite said second chamber, such means exerting a constant force tending to move said pressure responsive device to close said normally open valve and open said normally closed valve, pressure responsive means normally subject to pressure for rendering said last named means ineffective for moving said pressure responsive device, and an electromagnetic valve device operative for rendering said pressure responsive means inoperative whereby said means for exerting said constant force is released to move said pressure responsive device to disconnect said one chamber from said other chamber and connect said other chamber to said pressure chamber to thus supply pressure to said controlled pressure line.

6. A system according to claim 5 wherein said means for exerting said constant force comprises a compression spring.

7. A system according to claim 5 wherein said means for exerting said constant force comprises a compression spring, said pressure responsive means comprising a pressure responsive element engaging said spring, and a normally pressurized control chamber at the side of said pressure responsive element opposite said spring, said electromagnetic valve device being operative for relieving pressure from said control chamber.

8. A system according to claim 5 wherein said means for exerting said constant force comprises a compression spring, said pressure responsive means comprising a pressure responsive element engaging said spring, and a control chamber at the side of said pressure responsive element opposite said spring, said electromagnetic means comprising a three-way solenoid valve normally connecting said control chamber to said source of pressure and operative upon initial operation of said control valve means for relieving pressure from said control chamber.

9. A system according to claim 8 wherein said three-way solenoid valve comprises a normally open passage communicating with said control chamber, a normally open port communicating between said passage and said source of pressure, and a normally closed port communicating with the rear end of said service line and with said one chamber and having a circuit adapted to be closed upon initial operation of said control valve means whereby, when pressure in the rear end of said service line builds up, such pressure communicated to said control chamber, will increasingly oppose said spring.

10. In a tractor-trailer brake system, manually operable control valve means for supplying fluid pressure to actuators for the tractor brakes, a service line having a forward end connected to said control valve means to be supplied with pressure upon operation thereof, said service line having a rear end on the trailer, means including a controlled pressure line to operate trailer brake actuators, and an automatic valve mechanism having a plurality of chambers one of which is connected to the rear end of said service line and a second of which communicates with said controlled pressure line, a pressure responsive device dividing said chambers, and provided with a passage normally connecting said chambers, a normally open valve adapted to close said passage, a pressure chamber axially aligned with said one chamber and said other chamber and at the side of said other chamber opposite said one chamber, said pressure chamber being connected to said source, a normally closed valve connected to said normally open valve and controlling communication between said pressure chamber and said other chamber, means coaxial with said chambers and arranged at the side of said one chamber opposite said second chamber, such means exerting a constant force tending to move said pressure responsive device to close said normally open valve and open said normally closed valve, a control chamber, pressure responsive means normally subject to pressure in said control chamber for rendering said last named means ineffective for moving said pressure responsive device, and a pair of electromagnetic valve device in series, one of such valve devices communicating with said control chamber and normally communicating with said source, a normally closed line between said valve devices, circuits for said valve devices including a switch adapted to be closed upon initial operation of said control valve means to energize said one valve device to disconnect said control chamber from said source and open said control chamber to said normally closed line, said other valve device normally connecting said normally closed line to the rear end of said service line, the circuit for said other valve device comprising a normally open switch adapted to be closed when the trailer is carrying a light load, said other valve device, when energized, connecting said normally closed line to said other chamber whereby, when pressure builds up in said other chamber incident to opening said normally closed valve, such pressure will be communicated to said pressure responsive means to progressively oppose said force-exerting means whereby the latter will become inoperative for maintaining said normally closed valve open after a pre-determined pressure is reached in said other chamber.

11. In a tractor-trailer brake system having actuators for the tractor brakes and actuators for the trailer brakes, a service line having a forward end on the tractor connected to the tractor brakes and a rear end on the trailer, a brake pedal, control valve means operative by the brake pedal for supplying pressure to the forward end of said service line and thus to said tractor brake actuators, means including a controlled pressure line for operating the trailer brake actuators, and an automatic valve mechanism having a first chamber connected to the rear end of said service line, and having a second chamber communicating with said controlled pressure line and normally communicating with said first chamber, a first pressure responsive device between said chambers, a pressure chamber connected to a source of pressure and adapted for connection with said second chamber, pressure controlling means operable by said first pressure responsive device and having a normal position from which it is movable to disconnect said second chamber from said first chamber and connect it to said pressure chamber, a second pressure responsive device separate from said first pressure responsive device and having a control chamber at one side normally connected to said source of pressure to maintain said pressure controlling means inoperative, and electromagnetic valve means operable upon initial operation of said control valve means for releasing pressure from said control chamber to render said pressure controlling means operative for connecting said pressure chamber to said second chamber to supply pressure thereto and thus to said controlled pressure line.

12. A system according to claim 11 wherein said electromagnetic valve means comprises a pair of three-way solenoid valves, and means for selectively operating said solenoid valves to connect said control chamber to the rear end of said service line or to said second chamber to vary the effectiveness of said pressure controlling means for admitting pressure to said second chamber.

References Cited in the file of this patent
UNITED STATES PATENTS
2,941,844   Stelzer _____ June 21, 1960